Thomas Stibbs.
Yarn-Hook.

117,218

PATENTED JUL 18 1871

Witnesses:

Inventor:
Thos Stibbs
PER
Attorneys.

117,218

UNITED STATES PATENT OFFICE.

THOMAS STIBBS, OF WOOSTER, OHIO.

IMPROVEMENT IN SKEIN-TWISTING MACHINES.

Specification forming part of Letters Patent No. 117,218, dated July 18, 1871.

*To all whom it may concern:*

Be it known that I, THOMAS STIBBS, of Wooster, in the county of Wayne and State of Ohio, have invented a new and Improved Skein-Twisting Machine; and I do hereby declare the following to be a full, clear, and exact description of the same, reference being had to the accompanying drawing making a part of this specification, in which—

Figure 1:
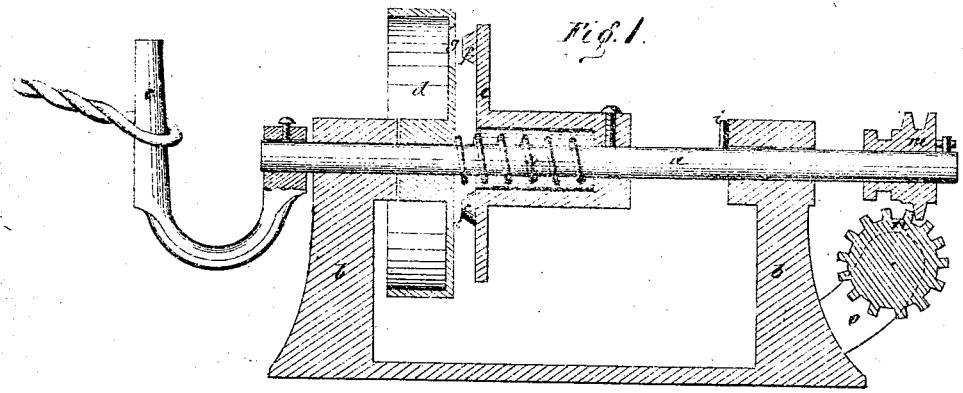
Figure 2:
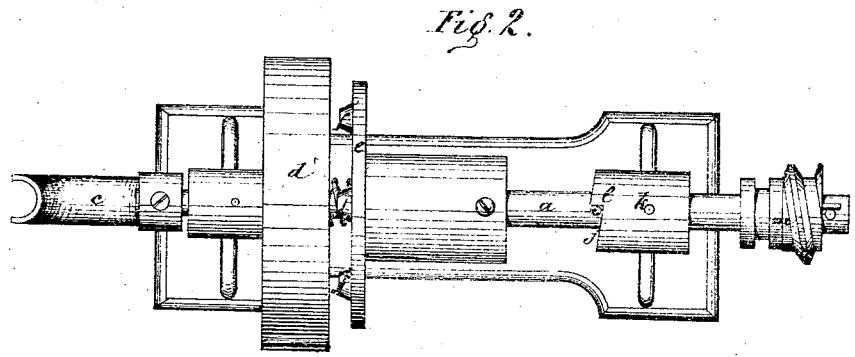

Figure 1 is a longitudinal vertical section, and Fig. 2 a top view.

This invention relates to an improved mechanism for twisting skeins of yarn preparatory to tying them into hanks, said mechanism consisting of a hook fixed on the end of a shaft supported in a suitable frame, and of a notched bearing for stopping the rotation of the shaft at the desired moment, and of a pulley placed loosely on said shaft, and driven independently of it, and of a clutch fixed on the shaft, by means of which, when the clutch, by moving the shaft endwise, is thrown into gear with the pulley, the shaft is rotated and the hook also, so that when the bight of a skein of yarn is placed on said hook the skein becomes twisted thereby, such twisting ceasing when the operator stops pulling on the skein, the clutch being then thrown out of gear with the pulley by means of a spring.

Referring to the drawing, $a$ is the shaft aforesaid; $b\ b$, the standards which support it; $c$, the hook on its end; $d$, the pulley placed loosely on it and kept in rotation by independent belting; $e$, the clutch fixed on the shaft and provided with bosses $f$ at one side, which fit corresponding holes $g$ in the pulley $d$; $h$, a spiral spring placed within a recess in the hub of the clutch $e$ and pressing the latter away from the pulley $i$, a radial pin projecting from the shaft $a$; $j$, a recess in the end of the box $k$, which the pin $i$ enters. The pulley $d$ being set in rotation, and a skein of yarn passed over the hook $c$, by pulling on the skein hard enough to overcome the resistance of the spring $h$ the operator is enabled to draw the clutch $e$ toward the pulley so far as to cause the bosses $f$ to enter the holes $g$. Thereupon the shaft and hook begin to rotate, twisting the skein. When the twisting process has gone far enough the operator has only to cease pulling on the skein, when the spring $h$ will at once throw the clutch out of gear with the pulley. The momentum acquired by the hook while rotating is always sufficient to turn the hook till the pin $i$ strikes the shoulder $l$ of the recess $j$. As this shoulder is exactly at the middle of the upper side of the box $k$ it stops the hook $c$ in a vertical position, which is a convenient one for taking off the skein. The hook cannot stop in any other position. On the shaft $a$ near its rear end is a sliding spirally-grooved hub, $m$, which engages with a cog-wheel, $n$, mounted on a pin that extends laterally from an arm, $o$. The wheel $n$, being rotated as the shaft $a$ turns, may serve as an indicator to show when the skein is sufficiently twisted.

Having thus described my invention, what I claim therein as new, and desire to secure by Letters Patent, is—

The combination of the shaft $a$, pin $i$, notched or shouldered bearing or box $k$, clutch $e$, spring $h$, loose pulley $d\ g$, and hook $c$, substantially as shown and described.

THOMAS STIBBS.

Witnesses:
 ISAAC JOHNSON,
 JAMES H. ROBERTSON.